(12) United States Patent
Bittle et al.

(10) Patent No.: US 8,177,874 B2
(45) Date of Patent: May 15, 2012

(54) FILTER ASSEMBLY

(75) Inventors: Thomas S. Bittle, Newcastle Upon Tyne (GB); Brian Lane, S. Russell, OH (US)

(73) Assignee: Parker Hannifin Limited, Hemel Hempstead (GB)

( * ) Notice: Subject to any disclaimer, the term of this patent is extended or adjusted under 35 U.S.C. 154(b) by 183 days.

(21) Appl. No.: 12/691,801

(22) Filed: Jan. 22, 2010

(65) Prior Publication Data

US 2010/0154372 A1 Jun. 24, 2010

Related U.S. Application Data

(63) Continuation of application No. PCT/GB2008/002608, filed on Jul. 31, 2008.

(30) Foreign Application Priority Data

Aug. 4, 2007 (GB) .................................. 0715269.7

(51) Int. Cl.
*B01D 46/00* (2006.01)
(52) U.S. Cl. ................. 55/478; 55/498; 55/502; 55/504; 210/443; 210/444
(58) Field of Classification Search ..................... 55/498, 55/502, 503, 504, 478, 480, 495; 210/443, 210/444, 497.01
See application file for complete search history.

(56) References Cited

U.S. PATENT DOCUMENTS 3,954,428 A 5/1976 Marple et al.
(Continued)

FOREIGN PATENT DOCUMENTS

BE 1011567 A3 11/1999
(Continued)

OTHER PUBLICATIONS

Corresponding Priority Application No. GB0715259.7 Search Report under Section 17 dated Dec. 4, 2007 from the Great Britain Patent Office.

(Continued)

*Primary Examiner* — Robert Clemente
(74) *Attorney, Agent, or Firm* — Christopher H. Hunter

(57) ABSTRACT

A filter assembly for removing material entrained in a fluid stream, comprises a housing for a filter element, having a head part and a body part for receiving a filter element, and inlet and outlet ports for the fluid that is to be filtered. The head part and the body part each have engagement formations which enable the head and body parts to be connected to one another and separated by relative rotation about an axis which is coaxial with a head axis and a body axis. Head and body part keying formations can be provided in the form of at least one recess which is provided in a rib on one of the head and body parts, and at least one projection which is provided on the other of the head and body parts. The keying formations require alignment of the head and body axes for initial assembly of the head and body parts when the projection is can be received in the recess in the rib so as to restrict relative rotation of the head and body parts, and so that the head and body parts can then be moved to an assembly position in which the projection has passed through the rib so that the head and body parts can be rotated relative to each other to allow the engagement formations to become engaged to one another.

10 Claims, 9 Drawing Sheets

U.S. PATENT DOCUMENTS

| | | | | |
|---|---|---|---|---|
| 4,774,853 | A | * | 10/1988 | Takahashi .................... 74/606 R |
| 4,877,521 | A | * | 10/1989 | Petrucci et al. ................ 210/171 |
| 4,915,831 | A | * | 4/1990 | Taylor ........................... 210/232 |
| 4,948,505 | A | * | 8/1990 | Petrucci et al. ................ 210/238 |
| 5,114,572 | A | | 5/1992 | Hunter et al. |
| 5,336,406 | A | * | 8/1994 | Stanford et al. .............. 210/235 |
| 5,456,830 | A | * | 10/1995 | Stanford et al. .............. 210/235 |
| 5,486,288 | A | * | 1/1996 | Stanford et al. .............. 210/235 |
| 5,826,854 | A | * | 10/1998 | Janvrin et al. .............. 251/149.9 |
| 6,458,269 | B1 | * | 10/2002 | Bassett et al. ................. 210/119 |
| 6,533,933 | B1 | * | 3/2003 | Stankowski et al. .......... 210/232 |
| 6,695,891 | B2 | * | 2/2004 | Reid ............................... 55/495 |
| 6,977,006 | B2 | * | 12/2005 | Reid ............................... 55/495 |
| 7,022,228 | B2 | | 4/2006 | Hennes et al. |
| 7,407,148 | B2 | | 8/2008 | Bassett et al. |
| 7,445,710 | B2 | * | 11/2008 | Stankowski et al. .......... 210/232 |
| 7,476,314 | B2 | | 1/2009 | Reid |
| 2003/0141235 | A1 | * | 7/2003 | Stankowski et al. .......... 210/232 |
| 2006/0065607 | A1 | | 3/2006 | Bassett et al. |
| 2006/0186031 | A1 | | 8/2006 | Fick et al. |
| 2007/0095744 | A1 | | 5/2007 | Bagci et al. |

FOREIGN PATENT DOCUMENTS

| | | |
|---|---|---|
| DE | 199 05 601 A1 | 8/2000 |
| EP | 0 081 826 B1 | 5/1988 |
| GB | 2 290 486 A | 1/1996 |
| WO | 2006/01333 A1 | 2/2006 |
| WO | 2009/019442 A1 | 2/2009 |
| WO | 2009/019443 A1 | 2/2009 |

OTHER PUBLICATIONS

Notification of Transmittal of The International Search Report and Written Opinion, dated Nov. 25, 2008, in corresponding priority International Application No. PCT/GB2008/002608 (W02009/019442A1).

Notificaton of Transmital of The International Preliminary Report on Patentability dated Nov. 11 2009, in corresponding priority International Application No. PCT/GB2008/002608 (W02009/019442A1).

Search Report under Section 17 dated Dec. 3, 2007 from the Great Britain Patent Office in related Great Britain Patent Application No. GB0715247.3.

Notification of Transmittal of The International Search Report and Written Opinion, dated Nov. 20, 2008, in related International Application No. PCT/GB2008/002611 (WO 2009/018443A1).

Notification of Transmittal of The International Preliminary Report on Patentability, dated Nov. 5, 2009, in related International Patent Application No. PCT/GB2008/002611 (WO 2009/018443A1).

* cited by examiner

FILTER ASSEMBLY

CROSS REFERENCE TO RELATED APPLICATIONS

This application is a continuation of co-pending International Application No. PCT/GB2008/002608 filed Jul. 31, 2008, which application designated the United States, and which application claims priority to Great Britain Application No. 0715269.7, filed Aug. 4, 2007, the disclosure of each of which is incorporated herein by reference.

TECHNICAL FIELD

This invention relates to a filter assembly for removing material that is entrained in a fluid stream

BACKGROUND OF THE INVENTION

Filtration of a fluid, such as a gas in a compressed gas system is generally required so that the fluid is sufficiently free of contaminants (liquid, solid or gaseous) for a subsequent application or to minimise adverse effects of contaminants on components of the system. For example, removal of compressor oil from a compressed gas stream can be required to minimise chemical contamination and accumulation on valves which might lead to malfunction of the valves. It is known to treat a fluid stream to remove contaminants (liquid, solid or gaseous) by filtering the fluid stream, using a filter element, also known as a coalescing filter. It is also known to treat a fluid stream by imparting a helical flow to fluid entering the filter assembly, using a flow director, so that centrifugal forces causes separation of bulk liquid or solids, such as water, from the stream.

Filter assemblies typically comprise a housing comprising head and body parts, and a filter element which can be fitted within the housing. Such filter elements commonly have a wall of a filtration medium and an end cap with an inlet which can be sealed to the head part of the housing to provide a flow path for a fluid stream to be supplied to the space within the filter element. The inlet is provided by a port on an end cap of the element. The port has an O-ring seal on its external surface which is received in a bore within the housing end cap, in which it is compressed to form a seal.

It is important to ensure that the head and body parts of the housing are correctly fitted together before operation of the filter assembly. This is because if the head and body parts are not properly secured to each other, then there is a significant risk that the head and body will break away from each other due to the high internal pressures that the housing is under during operation of the filter assembly. This can be dangerous because the head and/or body part can be forced away from the filter assembly at high velocity which can cause damage to apparatus or users close to the housing.

SUMMARY OF THE INVENTION

The present invention provides an improved filter assembly which helps ensure the correct fastening of the body part with the head part.

Accordingly, in one aspect, the invention provides a filter assembly for removing material entrained in a gas stream, comprising:

a housing having a head part and a body part for receiving a filter element, and inlet and outlet ports for the gas that is to be filtered, the head part and the body part each having engagement formations which enable the head and body parts to be connected to one another and separated by relative rotation about an axis which is coaxial with a head axis and a body axis;

a filter element for removing material entrained in the gas stream that can be received in the body part; and head and body part keying formations, in the form of at least one recess and at least one projection, arranged so that, (i) when the head part and the body part are initially offered to one another to assemble the housing, the keying formations engage one another with the projection located within the recess, thereby restricting relative rotation between the head part and the body part, (ii) continued movement of the head part and the body part towards assembly of the housing causes the projection to be moved out of the recess so that the keying formations are disengaged, allowing relative rotation of the head and body parts without restriction by either the keying formations or the engagement formations, and (iii) the said relative rotation of the head and body parts after the keying formations have become disengaged allows the engagement formations to be aligned and to engage one another so that the head and body parts can be rotated to become sealingly connected to one another.

The assembly can include a filter element which can be fitted in the housing.

The assembly of the head and body parts of the housing will generally involve relative movement along a housing axis. The head and body parts are rotated relative to one another to connect them together by rotation about the housing axis. When connected, it will generally be required that there is an effective seal between them which can withstand operating pressures within the housing when it is in use. When connected, it will generally be required that the head and body parts are locked together in the sense that they cannot inadvertently be separated, for example due to vibration and the like. Appropriate locking arrangements for head and body parts of filter housings are well known.

The rotation of the head part relative to the body part which is possible after the keying formations have disengaged and prior to engagement of the engagement formations can be free rotation through as much as 360°. However, it is recognised that free rotation through a smaller angle might be appropriate for some applications. The angle through which relative rotation is possible will generally be greater than is possible when the keying formations are engaged with one another. It will be greater than is possible when the engagement formations have been aligned because relative rotation when the engagement formations have been aligned will drive the head and body parts together to assemble the housing and to form a seal between the head and body parts. Such rotation will not be free rotation.

Preferably, the head and body part keying formations are in the form of at least one recess which is provided in a rib on one of the head and body parts, and at least one projection which is provided on the other of the head and body parts, so that the keying formations require alignment of the axes of the head and body parts when the head and body parts are offered to one another to assemble the housing, when the projection is can be received in the recess in the rib.

It is an advantage of the invention that the alignment of the engagement formations on the head and body parts are controlled by the keying formations. The keying formations can require alignment of the axes of the head and body parts when the head and body parts are offered to one another to assemble the housing. The keying formations can therefore reduce the likelihood of misalignment of the body and head parts, and hence of their engagement formations, during assembly. The keying formations therefore ensure that the engagement formations are properly aligned at the point the engagement formations can engage each other. Proper alignment of the engagement formations ensures that when the engagement formations are tightened by relative rotation, they engage with each other in the way they are designed so as to provide the maximum engagement between the formations. If the engagement formations are not properly aligned before they are tightened, then the engagement formations will not engage in the way they are designed to do so. For example, if the engagement formations are in the form of cooperating threads, then the threads can be crossed if they are not properly aligned before they are tightened, which will provide a sub-optimal connection. The invention can therefore be seen as separating the alignment of the axes of the head and body parts, and the connection of the head and body parts which is performed by the engagement formations.

Preferably, the keying formations are shaped and sized so as to restrict relative rotation between the head and body parts when in the initially assembly position to not more than 10° about the head and body axes, more preferably to not more than 5°, especially preferably to not more than 1°.

Once the head and body parts have been moved to the fully assembled position, the projection is no longer received in the recess and so it is possible to freely rotate the head and body parts relative to each other.

It is important that the head and body parts can be tightened by relative rotation because this can provide a simpler and cheaper mechanism for fastening the head and body parts. Other mechanisms for fastening the head and body parts include the use of components in addition to the head and body parts, such as clips, which adds to the cost of manufacture and the complication of assembly.

Preferably the keying formations are configured so that the at least one projection and at least one recess can be aligned in not more than three rotational orientations, more preferably not more than two rotational orientations, especially preferably not more than one rotational orientation.

The at least one recess can be provided by the body part. In this case, the at least one projection can be provided by the head part. Optionally, the at least one recess can be provided by the head part. In this case, the at least one projection can be provided by the body part.

There can be provided at least two recesses and at least two projections. In such embodiments, at least one of the recesses and at least one of the projections can be provided by the head part.

The body part keying formations need not necessarily be provided as a single piece with the body part. The body part keying formations can be provided on the filter element. It can be easier to form the body part keying formations on the filter element, rather than on the body part itself.

Preferably, the filter element and the body part have interengaging formations, arranged so that the filter element can be received in the body part so that the filter element rotates with the body part. Preferably, the interengaging formations are in the form of at least one rib and at least one groove arranged so that the rib can be slid into the groove when the filter element is fitted into the body part. Preferably, the interengaging formations are arranged so that the filter element can be received in the body part in one rotational orientation only. This is advantageous because the rotational orientation of the filter element relative to the head part can be controlled by the combination of the interengaging formations between the filter element and the body part, and the head and body part keying formations.

The filter element can have a filter port for the fluid. When the filter element is a coalescing type filter, as discussed in more detail below, then the filter port will be a port for fluid to be filtered to flow into the coalescing filter. When the filter element is a flow director that arranged to impart a helical flow to incoming fluid, as discussed in more detail below, then the filter port will be a port for fluid that has been filtered to flow out of the filter element. Preferably, the filter port provides the body keying formations. Providing the body keying formations on the filter port rather than on other parts of the filter assembly reduces the number of restrictions that fluid flowing through the filter assembly is exposed to. Accordingly, this reduces the pressure drop experienced across the filter assembly.

The assembly can provide at least two recesses and at least two projections. In such embodiments, at least one of the recesses and at least one of the projections can be provided by the head part.

The body part keying formations need not necessarily be provided as a single piece with the body part. The body part keying formations can be provided on the filter element. It can be easier to form the body part keying formations on the filter element, rather than on the body part itself.

Preferably, the filter element and the body part have interengaging formations, arranged so that the filter element can be received in the body part so that the filter element rotates with the body part. Preferably, the interengaging formations are in the form of at least one rib and at least one groove arranged so that the rib can be slid into the groove when the filter element is fitted into the body part. Preferably, the interengaging formations are arranged so that the filter element can be received in the body part in one rotational orientation only. This is advantageous because the rotational orientation of the filter element relative to the head part can be controlled by the combination of the interengaging formations between the filter element and the body part, and the head and body part keying formations.

The filter element can have a filter port for the gas. When the filter element is a coalescing type filter, as discussed in more detail below, then the filter port will be a port for gas to be filtered to flow into the coalescing filter. When the filter element is a flow director that arranged to impart a helical flow to incoming gas, as discussed in more detail below, then the filter port will be a port for gas that has been filtered to flow out of the filter element. Preferably, the filter port provides the body keying formations. Providing the body keying formations on the filter port rather than on other parts of the filter assembly reduces the number of restrictions that gas flowing through the filter assembly is exposed to. Accordingly, this reduces the pressure drop experienced across the filter assembly.

Preferably, at least one of the inlet and outlet ports is provided in the head part which has internal walls which define a primary chamber within the head part having a first end communicating with the at least one port in the head and a chamber port at a second end, and in which a fluid tight connection can be provided between the filter port and the chamber port by sliding one of them into the other. Preferably, the filter port and chamber port can be connected to provide the fluid tight connection only when the at least one projection and the at least one recess are aligned. This helps to ensure that the filter port and chamber port are properly received in each other so as to form the fluid tight connection.

Preferably, the filter port can rotate relative to the chamber port after they have been connected to provide the fluid tight connection. This is advantageous because this allows the fluid tight connection to be formed before the head and body parts have been fastened together by relative rotation.

Being able to control the initial orientation of the filter element relative to the head part and then being able to rotate the filter element relative to the head part is particularly important in embodiments in which one of the head part and the filter element of the filter assembly provides an inclined surface, against which an ejector part on the other of the head part and the filter element can act so as to push the filter element away from the head part as the head part and the body part are separated by relative rotation, so as to free the filter port from the chamber port. Preferably, the ejector part is provided by a complimentary inclined surface. Details of such a filter assembly are disclosed in the international application which claims priority from UK Patent Application no. 0715247.3 entitled Filter Assembly.

In such embodiments, it is important to restrict the orientation of the filter element relative to the head part when initially locating the filter element in the head part. This is because if the filter element is inserted so that the ejector part initially engages the lowest part of the inclined surface, then it will not be possible to subsequently secure the head and body parts of the housing by relative rotation, as the inclined surface and the ejector part will act against each other to prevent the bringing together of the head part and the body part. However, while it is important to ensure that the head part and the filter element are initially brought together in a particular orientation, it is also necessary to allow the filter element to subsequently rotate relative to the head part. This is so that as the head and body parts are fully tightened, the inclined surface and ejector part slides relative to each other so that the ejector part engages the highest part of the inclined surface.

Preferably, the body part keying formations is provided by the inner side wall of the filter port. More preferably, the body part keying formations is provided by a recess in the inner side wall of the filter port. Preferably, there is provided a flange extending around the inner side wall of the filter port, and in which the at least one recess is provided in the flange.

The head part keying formations can be provided by the internal walls of the head part. The head part keying formations can be provided by the internal walls at the second end of the primary chamber. When the filter port is configured to slide within the chamber port, preferably the head part keying formations is provided within the primary chamber.

The head part keying formations can be provided by a separate piece to the internal walls of the head part. Preferably, the head part keying formations is provided by an insert that is formed separately to the internal walls of the head part. Preferably, at least a portion of the insert is located in the primary chamber. Optionally, the insert can be removed from the primary chamber. This is advantageous because it can be easier to form the head part keying formations separately to the head part. It also enables different shaped and sized keying formations to be inserted into a given head part. This can be advantageous when the head part can be used with different types of filter element having different dimensions.

The primary chamber defines a flow conduit which fluid flows through between the at least one port in the head and the chamber port. Preferably, the insert and primary chamber together define a portion of the flow conduit. For example, the primary chamber can define a turn in the flow conduit between its first and second ends. In this case, optionally the insert to be can be inserted into the flow conduit at the turn so that the outer corner of the turn, distal the point about which the flow conduit turns, is defined by the internal walls of the head part and the inner corner of the turn, proximal the point about which the flow conduit turns, is defined by the insert.

Preferably, the insert comprises a tubular wall, at least a portion of the length of which can be inserted into the primary chamber, so that the primary chamber and the hollow space defined by the tubular wall together define the flow conduit for fluid to flow from the at least one port in the head and the filter port. Preferably, the head part keying formations is located between the tubular wall of the insert and the internal walls which define the primary chamber. This is advantageous because the head part keying formations will not be located in the flow conduit and so will not interfere with the flow of fluid through the flow conduit. Preferably, the head part keying formations is provided by the outer side of the tubular wall of the insert. The outer side is the side of the tubular that faces the internal walls which define the primary chamber when assembled.

Preferably, the filter port is provided by a wall that projects from the filter element. Preferably, the wall of the filter port can extend into the space between the tubular wall of the insert and the internal wall of the head part.

Preferably, the filter assembly further comprises a head part stop member and a body part stop member positioned to engage each other so as to prevent relative rotation of the head and body parts during separation, when the keying formations are aligned. This is advantageous because the user knows when the keying formations are aligned and so the user knows at what point to draw the body part away from the head part.

Preferably, one of the head part stop member and the body part stop member is the at least one projection. Preferably, the head part stop member is the at least one projection. Accordingly, in this case, the head part stop member is the head part keying formation. In this case, preferably, the body part stop member is provided by a corresponding projection located on the side of the body part keying formation that the head part keying formation is located once the filter assembly is fully assembled. When the at least one recess is provided in the flange in a filter element's filter port, preferably the body part stop member is a projection located on the side of the flange distal to the free end of the filter port, adjacent the at least one recess.

The filter element can be a filter element which is suitable for removing compressor oil from a fluid stream. Such filter elements are also known as coalescing filters. Coalescing filters are used to collect oil that is entrained in a fluid stream by causing aerosol droplets of the oil to coalesce and collect as drops, which can flow as a liquid. They generally comprise several layers of filter media. For example, filter elements generally comprise a cylindrical filtration layer and a cylindrical anti-reentrainment barrier or a "drainage layer" surrounding the filtration layer on the outside of the filter element. The density and thickness of the media layers are selected according to, amongst other factors, the flow rate of the fluid stream, the level and nature of the impurities in the fluid stream, the level of impurity that is sought in the fluid stream after filtration.

Alternatively, the filter element can be a flow director positioned so that fluid flowing into the housing flows over the flow director so that the incoming fluid is made to follow a generally helical path within the housing. In this case, the filter assembly utilises centrifugal forces caused by the helically flowing fluid stream to separate bulk liquid, such as water, from the fluid stream.

The filter element can be used to remove contaminants from a liquid stream, especially solid contaminants or quantities of immiscible liquids.

BRIEF DESCRIPTION OF THE DRAWINGS

Embodiments of the invention will now be described, by way of example only, and with reference to the accompanying drawings, in which.

DETAILED DESCRIPTION OF THE INVENTION

Figure 1:
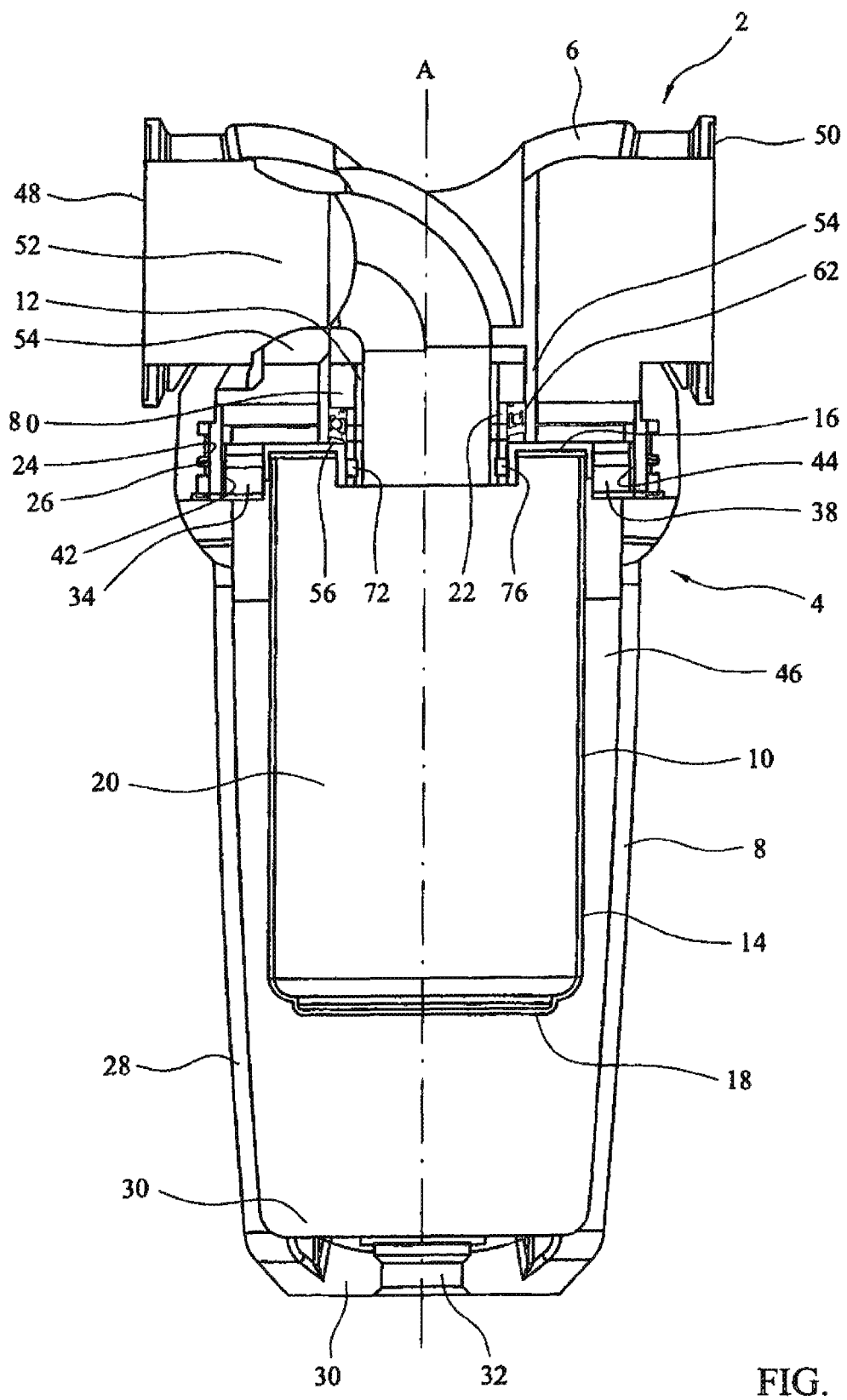
FIG. 1 is a sectional side view through a filter assembly according to the present invention which comprises a filter element and the housing in which the device is located when in use.

Referring to the drawings, FIG. 1 shows a filter assembly 2 which comprises a housing 4, having a head part 6 and a body part 8, a filter element 10, and a flow controller 12. The head 6 and body 8 parts each have engagement formations in the form of co-operating screw threads 24, 26 which allow the head 6 and body 8 parts to be connected to one another and separated by relative rotation about axis A. The head part 6 has a head axis and the body part 8 has a body axis, each of which are co-axial with the axis A.

Figure 2:
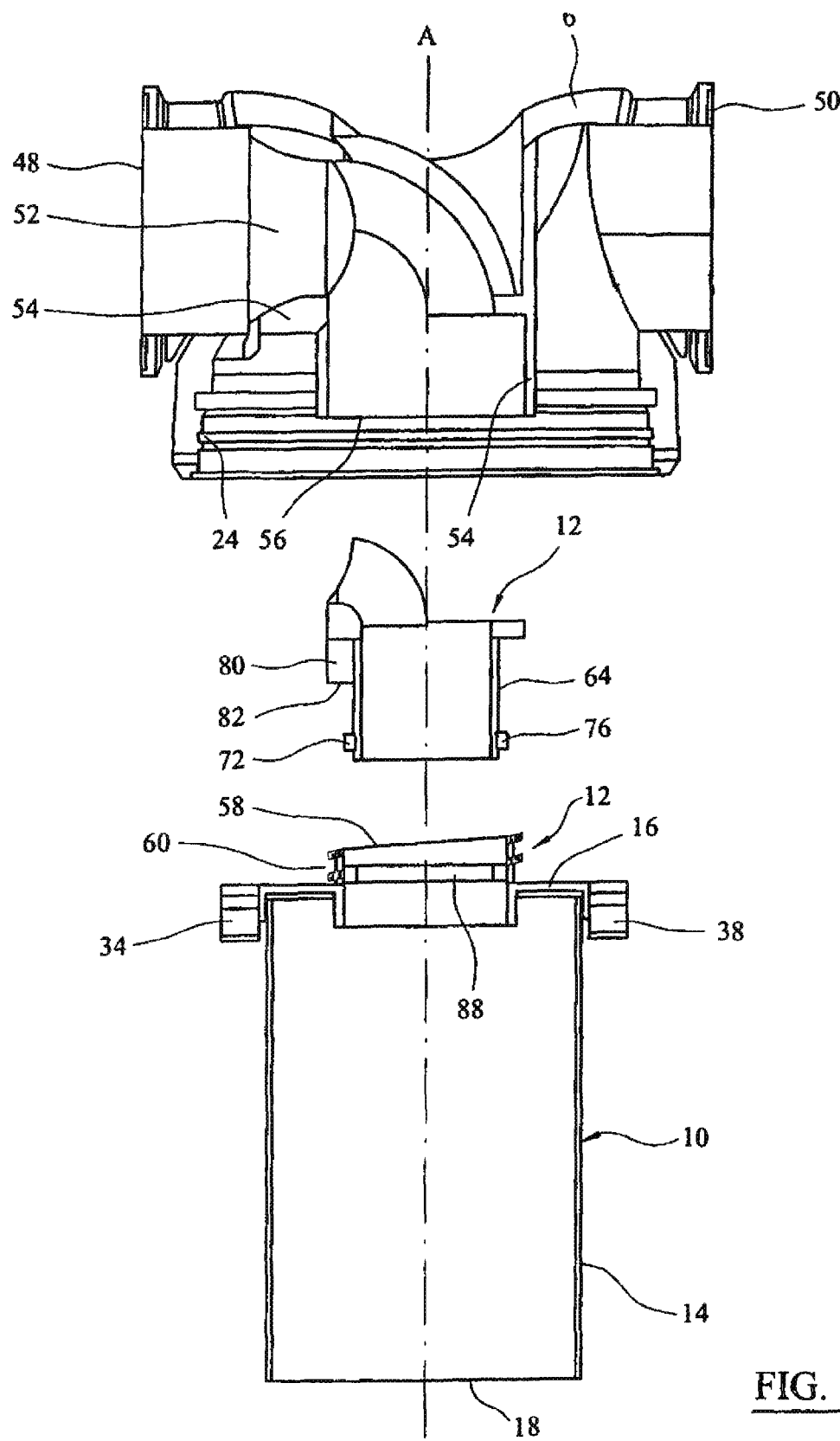
FIG. 2 is a sectional elevation of the filter assembly shown in FIG. 1, showing the head part of the housing, the filter element, and the flow controller of the filter assembly separated from each other.
Figure 3:
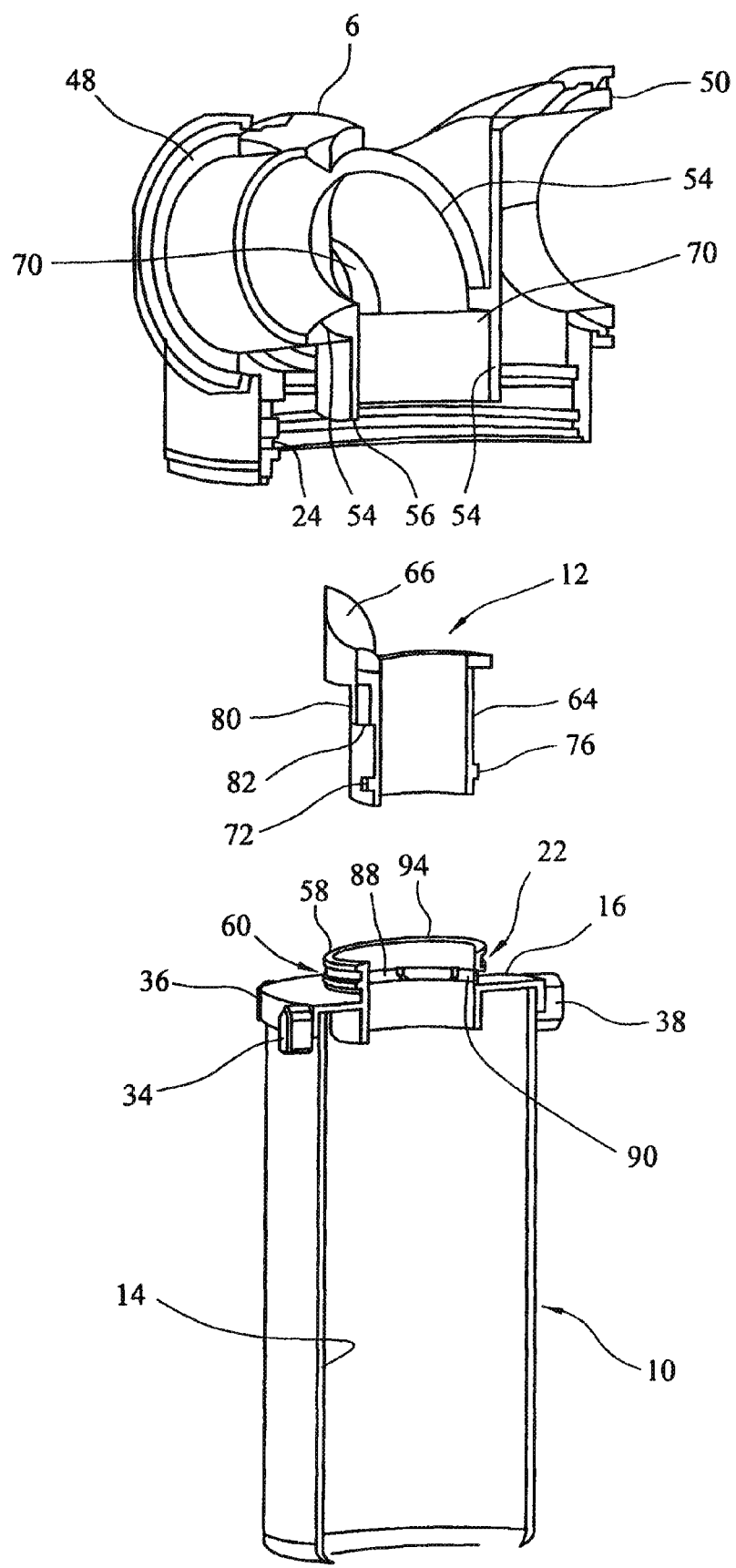
FIG. 3 is a sectional perspective view of the components shown in FIG. 2.
Figure 4:
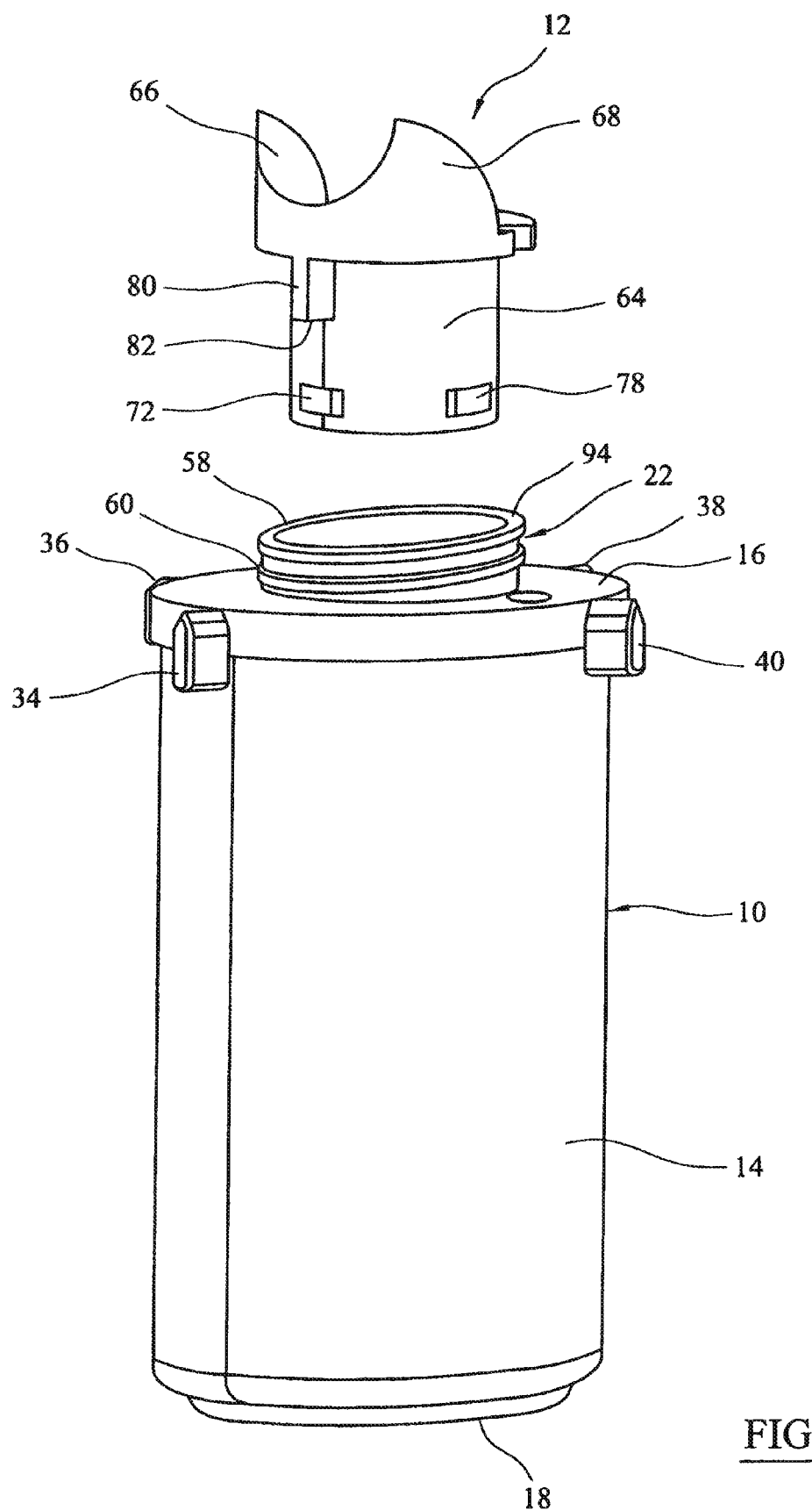
FIG. 4 is a perspective view of the flow controller and the filter element of the filter assembly shown in FIG. 1, separated from each other.

In the embodiment described, the filter element 10 is a filter element 10 which comprises a cylindrical wall section 14 formed from a filter medium, and top 16 and bottom 18 end caps. As best shown in FIGS. 2 to 4, the wall section 14 of the filter element 10 defines a hollow space 20 within it.

The top 16 and bottom 18 end caps are formed from a polymeric material. As will be understood, suitable polymeric materials include polyolefins (especially polyethylene and polypropylene), polyesters, polyamides, polycarbonates and the like. Optionally, the polymeric materials used for the flow deflector can be reinforced, for example by fibrous materials (especially glass fibres or carbon fibres). The top 16 and bottom 18 end caps are formed by injection moulding. It will be understood that materials other than polymeric materials can be used, for example metals.

The filter medium of the wall 14 comprises a cylindrical filtration layer and a cylindrical anti-reentrainment layer or drainage layer which fits snugly around the filtration layer on the outside of the filter element. Materials suitable for use as a filtration medium (or a filtration layer) include, borosilicate and other glass fibres, activated carbon minerals, activated silica materials and so on. Materials suitable for use as the drainage layer are used in similar products sold by Domnick Hunter Limited under the trade mark OIL-X. Suitable materials include open-celled foam plastics, felted fabric material, and expanded foam materials. The top and bottom parts of the wall section 14 are sealed to the top 16 and bottom 18 end caps respectively so that all fluid to be filtered flows through filter medium of the wall section 14.

The top end cap 16 has a filter port 22 by which fluid which is to be filtered can enter the hollow space 20 in the filter element 10. The filter port 22 projects from the top end cap 16 of the filter element 10, as is best shown in FIGS. 2 to 4. The angle between the free end 58 of the filter port 22 and the axis A is about 15°. Accordingly, the free end 58 provides an included surface 94 that is inclined relative to axis A. An annular recess 60 extends around the filter port 22. The annular recess 60 is inclined relative to the axis A by 15°. An O-ring 62 (shown in FIG. 1 only) is located in the annular recess 60.

Figure 5:
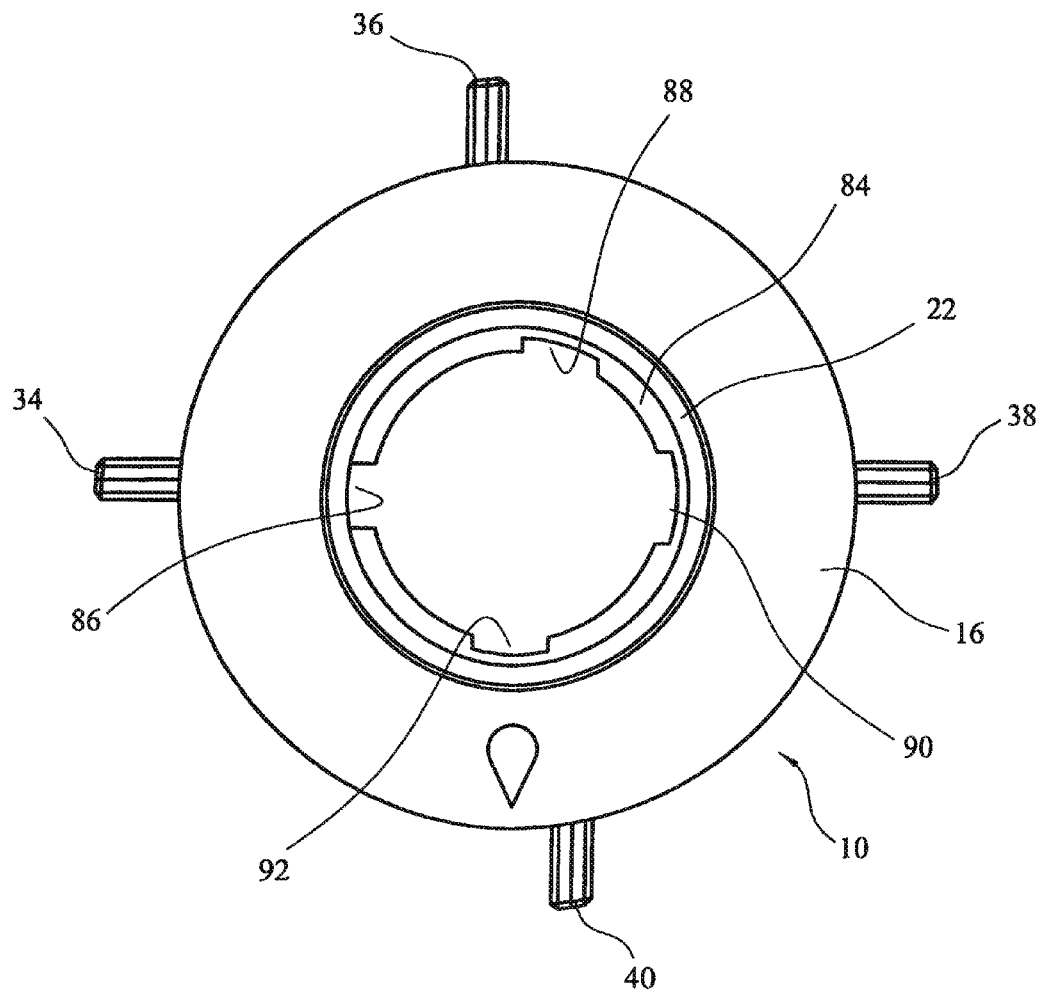
FIG. 5 is a top view of the filter element of the filter assembly shown in FIG. 1.

As best shown in FIG. 5, the inner side of the filter port 22 is provided with an annularly extending flange 84. The flange 84 has first 86, second 88, third 90 and fourth 92 recesses in it.

Figure 7:
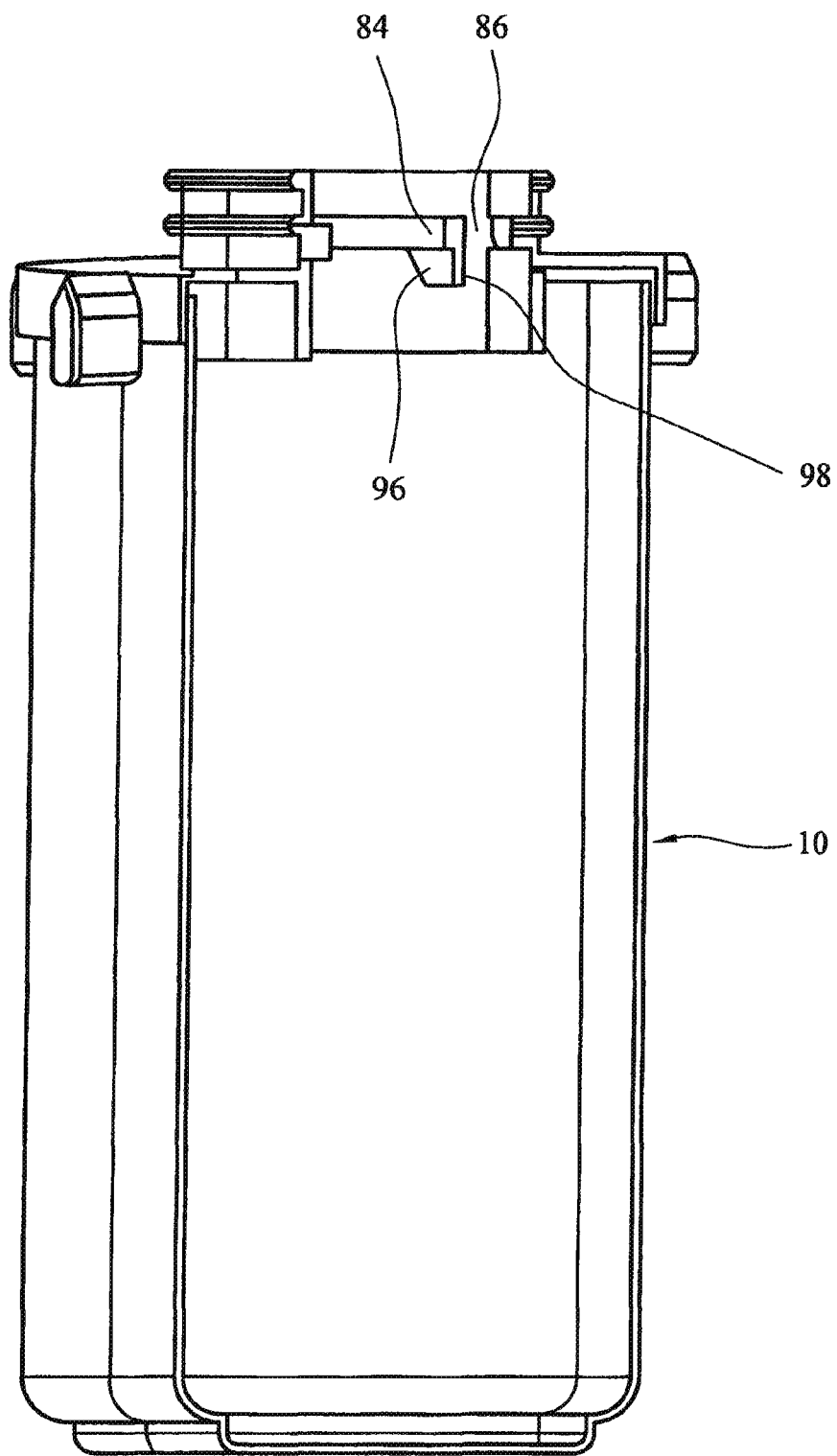
FIG. 7 is a cross-sectional perspective view of the filter element of the filter assembly shown in FIG. 1.

As best shown in FIG. 7, a stop member 96, in the form of a projection, is provided on the underside of the flange 84. An abutment surface 98 of the stop member 96 is located so that it is aligned with edge of the first recess 86.

The top end cap 16 also has first 34, second 36, third 38 and fourth 40 ribs around its perimeter that extend from the top end cap 16 towards the bottom end cap 18, on the exterior of the filter element 10. The ribs 34, 36, 38, 40 can engage corresponding grooves in the body part 8 to locate the filter element 10 in the body part 8 as described in more detail below.

The four ribs 34, 36, 38, 40 are spaced apart around the top end cap 16. The ribs 34, 36, 38, 40 are identical in shape size and configuration. The leading edge of the ribs 34, 36, 38, 40 (which is directed into the fluid stream when in use) is rounded and the trailing edge of the ribs 34, 36, 38, 40 is tapered inwardly, towards (optionally to) a sharp edge or point. The ribs 34, 36, 38, 40 are approximately aerofoil-shaped when viewed in cross-section (perpendicular to the axis of the assembly). This shape gives minimal resistance to the flow of fluid past the ribs.

FIG. 5 shows that the four ribs 34, 36, 38, 40 are not equally spaced around the top end cap 16. This is so that the filter element 10 can be received in the body part 8 in one rotational orientation only.

The flow controller 12, has a tubular part 64 having first and second ends, and first 66 and second 68 wing members extending from the first end of the tubular part 64 that together define a corner of an open tube. In the embodiment shown, the tubular part 64, and first 66 and second 68 wing members are formed as a single piece. First 72, second 74, third 76 and fourth 78 male keying formations protrude radially from the tubular part 64 of the flow controller 12, and are located toward the second end of the tubular part 64.

The flow controller 12 also has an ejector part 80, in the form of a projection extending radially from the tubular part 64, and is located toward the first end of the tubular part 64. The ejector part 80 presents a flat surface 82 facing the second end of the tubular part 64.

The housing comprises a head part 6 and a body part 8 which can be connected to one another by means of cooperating screw threads at their interfaces 24, 26. The head part 6 and body part 8 are formed from a metallic material, especially aluminium or an alloy thereof. They can be formed by machining, or by techniques such as casting.

The body part 8 comprises a cylindrical wall 28, an end wall 30 at one end of the cylindrical wall, and an open end at the opposite end of the cylindrical wall. First 42, second (not shown), third 44 and fourth (not shown) grooves are provided in the interior of the body part 8 at the open end. The first 42, second, third 44 and fourth grooves are shaped, sized and located so that they can slidingly receive the first 34, second 36, third 38 and fourth 40 ribs, respectively, as described in more detail below.

The body part 8 defines a space within which the filter element 10 is coaxially located when in use. Liquid drops which drain from the drainage layer of the filter element 10 in use are collected in a reservoir 30 in the housing body. The housing includes a drain outlet 32, for example of the kind which is disclosed in EP-A-81826.

The head part 6 includes an inlet port 48 for fluid to be filtered to enter the filter assembly 2, and an outlet port 50 through which fluid which has passed through the wall 14 of the filter element 10 can be supplied to a downstream application.

The head part 6 also includes internal walls 54 which are formed as one piece with the head part 6, and which define a primary chamber 52. The primary chamber 52 communicates with the inlet port 48 at a first end and a chamber port 56 at its second end. The chamber port 56 is coaxial with the axis about which the head part 6 rotates relative to the body part 8 during assembly and disassembly as discussed in more detail below. The internal walls 54 are provided with recesses 70 towards the second end of the primary chamber 52 into which the tubular part 64 and the first and second 68 wing members of the flow controller 12 can be received.

The filter assembly 2 is assembled by sliding the flow controller 12 into the head part 6 conduit 52 through the chamber port 56 until it is fully received in the recesses 70 in the primary chamber 52. The recesses 70 are shaped and sized so that the first 66 and second 68 wing members and the tubular part 64 of the flow controller 12 are a snug fit within the recesses. When the flow controller 12 is fully received in the head part 6, the flow controller 12 and the internal walls 54 together define the path will take when entering the filter element as described in more detail below.

The filter element 10 is assembled in the body part 8 by co-locating the first 34, second 36, third 38 and fourth 40 ribs with the first 42, second, third 44 and fourth grooves of the body part 8, and then sliding the ribs into the grooves until they sit on the bottom of the grooves. Once the ribs 34, 36, 38, 40 have been fully received by the grooves 42, 44 the filter element 10 is securely suspended within the body part 8. Therefore, as will be appreciated, the axial position of the filter element 10 within the body part 8 can be controlled by the shape and size of the ribs 34, 36, 38, 40 and grooves 42, 44. Further, rotation of the filter element 10 relative to the body part 8 is inhibited by the interlocking of the ribs 34, 36, 38, 40 with the grooves 42, 44.

Once the filter element 10 is appropriately assembled in the body part 8, an annular space 46 is defined between the filter element 10 and the cylindrical wall 28 of the body part 8. The filter element 10 can be removed from the body part 8, by pulling the filter element 10 away from the body part 8 along its axis.

Figure 6:
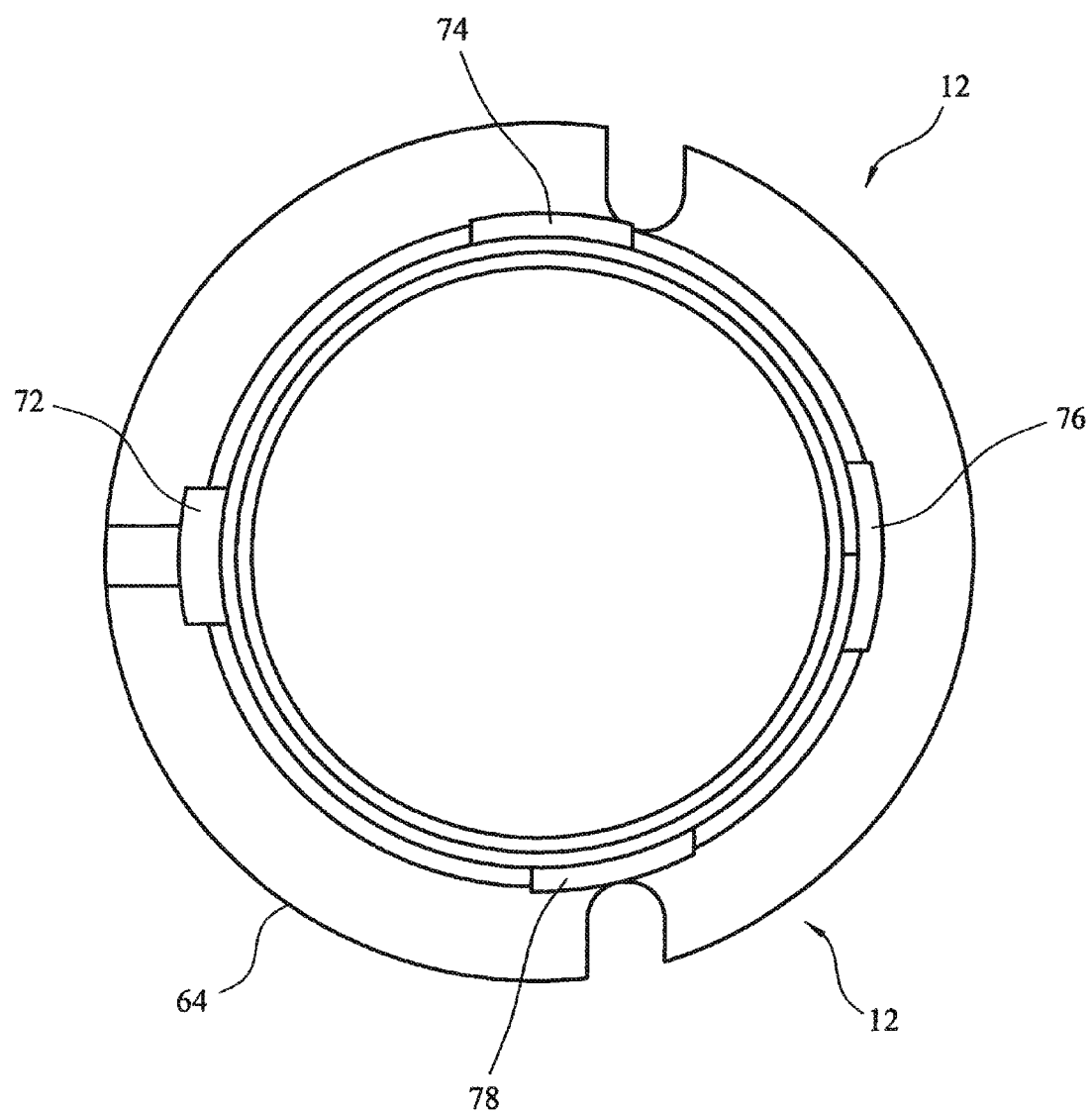
FIG. 6 is a bottom view of the flow controller of the filter assembly shown in FIG. 1.

The body part 8 and head part 6 are then initially assembled by locating the filter port 22 of the filter element 10 in the chamber port 56 of the head part 6, so that the male formations 72, 74, 76, 78 on the tubular part 64 of the flow controller 12 are received within the recesses 86, 88, 90, 92 in the flange 84 on the filter port 22. Due to the shape and configuration of the recesses 86, 88, 90, 92 and the male formations 72, 74, 76, 78, the male formations 72, 74, 76, 78 can only be received in the recesses 86, 88, 90, 92 when the head and body axes are aligned and only when the recesses 86, 88, 90, 92 and the male formations 72, 74, 76, 78 are co-located. As is shown in FIGS. 5 and 6, the recesses 86, 88, 90, 92 and the male formations 72, 74, 76, 78 are not spaced apart equally around the flange 84 and tubular member 64. This is so that the male formations 72, 74, 76, 78 can pass past the recesses 86, 88, 90, 92, and so that filter port 22 can only be fully received in the chamber port 56, in one rotational orientation only. Further, due to the male formations 72, 74, 76, 78 being a snug fit within the recesses 86, 88, 90, 92 the head 6 and body 8 parts cannot be rotated relative to each other when they are in the initial assembly position.

Once in the initial assembly position, the head 6 and body 8 parts can be moved to the fully assembled position by pushing them together. The head 6 and body 8 parts are in the fully assembled position once the male formations 72, 74, 76, 78 are no longer received in the recesses 86, 88, 90, 92, so that the head 6 and body 8 parts can be rotated relative to each other so that the cooperating screw threads 24, 26 can engage each other. Accordingly, once in the fully assembled position, the head part 6 and body part 8 can then be secured by rotating one relative to the other so that their cooperating screw threads at their interfaces 24, 26, are tightened to interlock with each other. As discussed above, the keying formations are arranged such that the male formations 72, 74, 76, 78 can only pass past the recesses 86, 88, 90, 92 when the head and body axes are co-axial. Accordingly, once the male formations 72, 74, 76, 78 have passed past the recesses 86, 88, 90, 92, the head 6 and body 8 parts will be orientated so that the co-operating screw threads at their interfaces 24, 26 are properly aligned.

When the head part 6 is secured to the body part 8, the O-ring 62 on the outer side of the filter port 22 is compressed between the filter port 22 and the internal walls 54 of the head part at the chamber port 56 end of the primary chamber 52 to form a fluid tight seal. Also, when the head part 6 is fully secured to the body part 8, the ejector part 80 and the free end 58 of the filter port 22 are configured such that the flat surface 82 of the ejector part 80 engages the inclined surface 94 of the free end 58 of the filter port 22 at its lowest point, that is the point of the inclined surface 94 that is most proximal the top end cap 16 of the filter element 10.

When the filter assembly 2 is assembled, the outlet port 50 communicates with the annular space 46 between the wall 14 of the filter element 10 and the cylindrical wall of the body part 8.

The filter assembly can be disassembled by rotating the body part 8 relative to the head part 6 so that their cooperating screw threads are loosened. Any rotational force that is imparted on the top end cap 16 of the filter element 10 by stictional forces between the O-ring 62 and the internal walls 54 of the head part 6 is negated by the opposite rotational drive that is provided by the ribs 34, 36, 38, 40 acting against the grooves 42, 44 in the body part 8 in which the ribs are received. Therefore, as the body part 8 is rotated relative to the head part 6, the filter element 10 also rotates with the body part 8 relative to the head part 6. Accordingly, the filter port 22 will rotate relative to the ejector part 80 and as it does so, the flat surface 82 of the ejector part 80 will engage inclined surface 94 and push the filter port 22 away from the ejector part 80.

The angle of inclination of the inclined surface 94, and the dimensions of the filter port 22, head part 6 and ejector part are such that when the filter port 22 has been rotated by 180° relative to the ejector part 80, the filter port 22 has been pushed away from the ejector part by an amount sufficient to push 50% of the circumferential length of the O-ring 62 out of the chamber port 56 so that the lower portion of the inclined O-ring is no longer compressed between the internal walls 54 of the head part 6 and the filter port 22. Accordingly, there will then be sufficiently small frictional engagement between the filter port 22 and the internal walls 54 of the head part 6 for the filter port 22 to be able to drop out of the chamber port 56 under the weight of the filter element 10 alone. Accordingly, the filter port 22 will be free from the chamber port 56.

Therefore, as the body part 8 is rotated relative to the head part 6, the filter element 10 will tend to reside in the body part 8 rather than be drawn away from the body part 8 with the head part 6.

The body part 8 and head part 6 can continue to rotate relative to each other so as to separate the body and head parts, until one of the projections 72, 74, 76, 78 abuts the abutment surface 98 of the stop member 96. At this point, the projections 72, 74, 76, 78 will be aligned with their corresponding recess 86, 88, 90, 92 so the body part 8 and filter element 10 can be drawn away from the head part 6.

In use, a fluid that is to be filtered enters the filter assembly 2 through the inlet port 48 in the head part 6 and is directed to the hollow space 20 in the filter element 10 by means of the primary chamber 52 defined by the internal walls 54 and the flow controller 12 in the head part 6.

From the hollow space 20, the fluid flows generally radially outwardly through the filter medium of the wall 14. Any liquid contaminants in a gas stream will be coalesced by the filtration layer and any coalesced liquid will be carried to the drainage layer by the flow of gas, where the liquid will be retained. The liquid will tend to drain to the bottom of the drainage layer, where it can tend to accumulate toward the bottom of the drainage layer, thereby forming a wet band. When that part of the drainage layer becomes sufficiently saturated, the liquid will begin to drain from any exposed parts of that part of the drainage layer, generally in the form of drops.

Filtered fluid exiting the filter element 10 enters the annular space 46 between the filter element 10 and the cylindrical wall 28. Filtered fluid is then discharged from the filter assembly through the outlet port 50 in the housing head 52, which is in fluid communication with the annular space 46.

Figure 8:
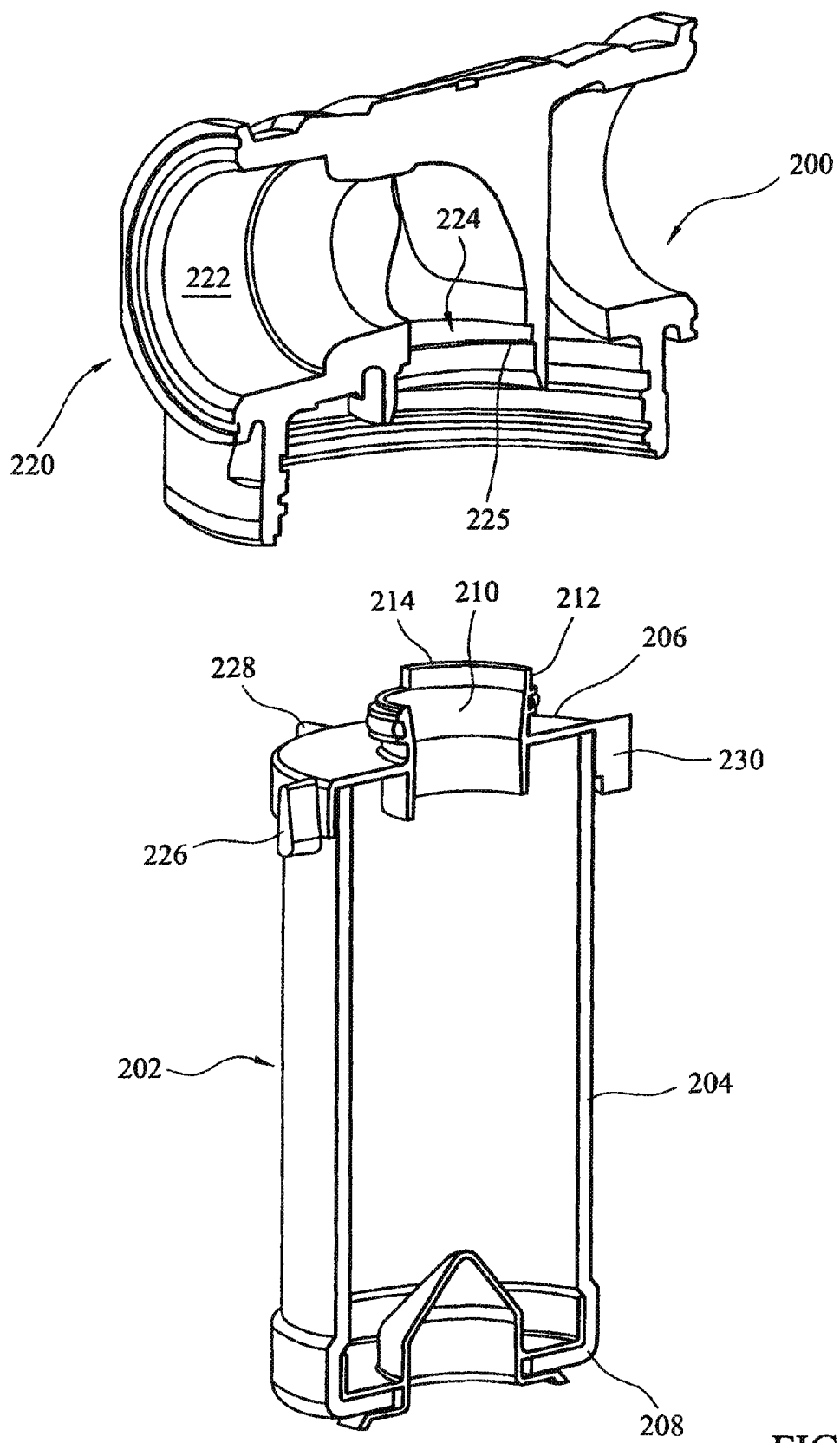
FIG. 8 is a sectional elevation of another embodiment of the filter assembly, showing the head part of the housing and the filter element separated from each other.

FIG. 8 shows another embodiment of filter assembly 200. The drawing shows the filter element 202 of the assembly and the head part 220 of the housing. The filter element comprises a wall section 204 and top and bottom end caps 206, 208.

The top end cap 206 has a filter port 210 formed in it defined by a wall 212. Fluid which is to be filtered can enter the hollow space within the filter element through the port 210.

The free end 214 of the port extends helically, inclined to the axis of the device. The angle between the free end of the port and the axis of the device is about 20°.

The head part 220 of the housing has an inlet port 222 which communicates with a chamber port 224 which is aligned with the axis of the assembly. A helical ejector surface 225 is provided within the chamber port, extending 360° around the assembly axis.

Figure 9:
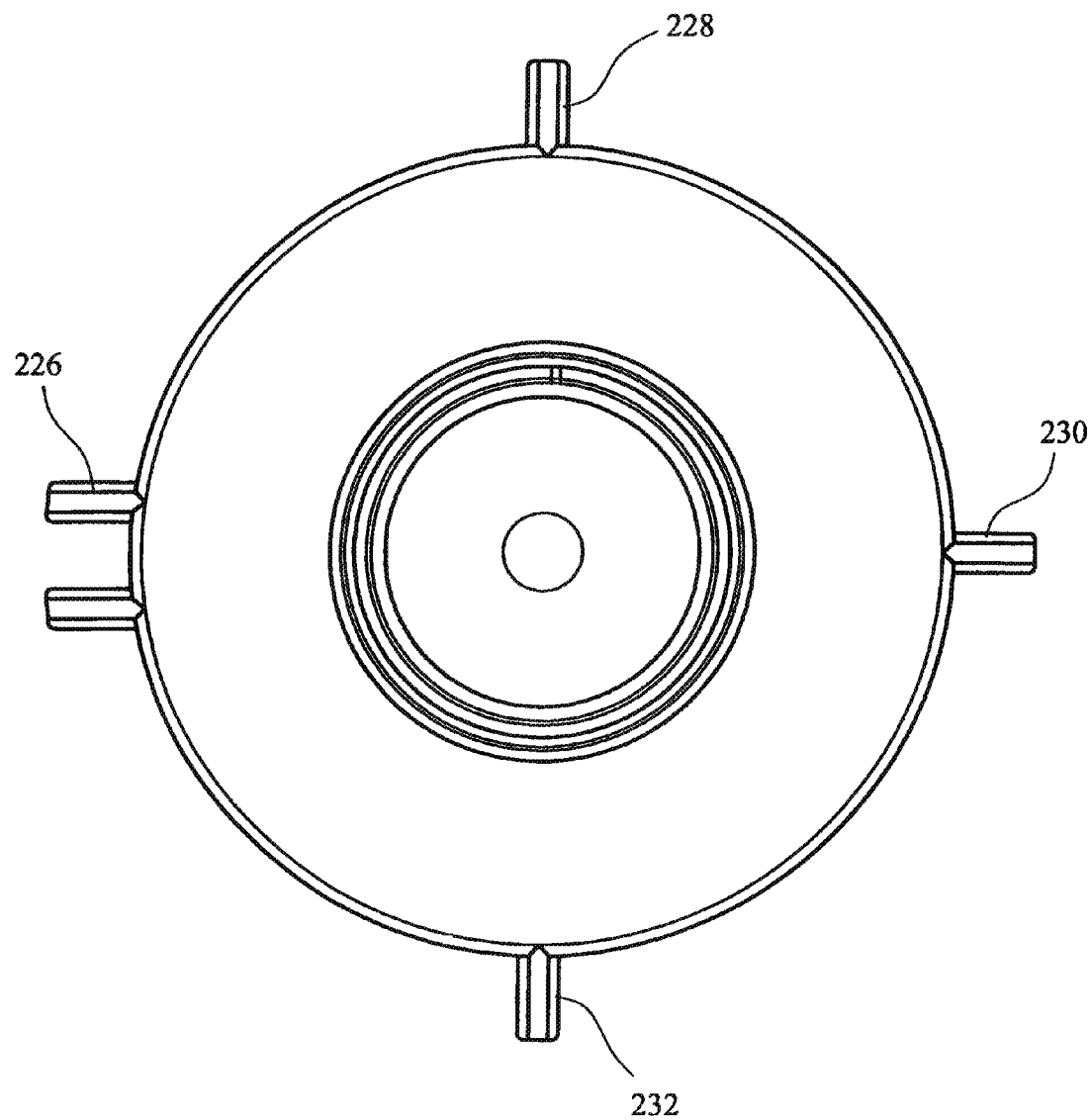
FIG. 9 is a top view of another embodiment of filter element.

As shown in FIG. 9, the top end cap of the filter element has four ribs 226, 228, 230, 232 spaced apart around its periphery, spaced apart approximately equally. One of the ribs 226 is provided in the form of a pair of spaced apart small ribs (or "riblets").

The filter element 202 is assembled in the body part of a housing by locating the ribs 226, 228, 230, 232 in respective grooves in the body part of a housing, in which the grooves are sized so that the ribs are a tight sliding fit, with one of the grooves being wider than the other grooves so as to accommodate the rib 226 which is provided in the form of a pair of spaced apart riblets. The ribs are slid into the grooves until they sit on the bottom of the grooves. Once the ribs have been fully received by the grooves the filter element 202 is securely suspended within the body part. Relative rotation of the filter element 202 relative to the body part is prevented by the interlocking of the ribs 226, 228, 230, 232 with the grooves in the body part.

Once the filter element 202 is appropriately assembled in the body part of a housing, an annular space is defined between the filter element and the cylindrical wall of the body part. The filter element 202 can be removed from the body part by pulling the filter element away from the body part along its axis.

The body part and head part 220 are then initially assembled by locating the filter port 210 of the filter element 202 in the chamber port 224 of the head part so that the helical surface provided by the free end 214 of the port 210 is offered towards the helical ejector surface in the chamber port. Assembly of the body part and the head part involves action of the cooperating threads on the two parts. Relative rotation between the body part and the head part causes the two parts to be drawn together. During such relative rotation, the helical surfaces, on the free end of the port and provided by the ejector surface in the chamber port respectively, allow the filter element to be displaced towards the head part of the housing, with the filter port 210 being received in the chamber port in the housing.

When the head part 220 is secured to the body part, an O-ring 221 in a peripheral groove on the outside of the filter port 210 is compressed between the filter port 210 and the internal walls of the head part at the chamber port 224 to form a fluid tight seal.

The filter assembly can be disassembled by rotating the body part relative to the head part so that their cooperating screw threads are loosened. The filter element turns with the body part as a result of the receipt in grooves in the body part of the ribs on the top end cap of the device. Therefore, as the body part is rotated relative to the head part, the filter element also rotates with the body part relative to the head part. Accordingly, the filter port 210 will rotate relative to the helical ejector surface 225 and, as it does so, the action of the helical ejector surface 225 against the free end 214 of the port 210 will cause the filter port to be ejected from within the chamber port.

What is claimed is:

1. A filter assembly for removing material entrained in a fluid stream, comprising:
   a filter element for removing material entrained in the fluid stream;
   a housing having a head part and a body part in which the filter element can be removably received, and inlet and outlet ports for the fluid that is to be filtered, the head part and the body part in which the filter element can be received each having locking formations which enable the head and body parts to be connected to one another and separated by relative rotation about an axis which is coaxial with a head axis and a body axis;
   keying formations associated with each of the head and body parts, in the form of at least one recess and at least one projection, in which the body part keying formations are provided on the filter element when it is positioned in the body part, arranged so that,
   (i) when the head part and the body part, with the filter element positioned in the body part, are initially offered to one another to assemble the housing, the keying formations on the head part and the filter element engage one another with the projection located within the recess, thereby restricting relative rotation between the head part and the body part, (ii) continued movement of the head part and the body part towards assembly of the housing causes the projection to be moved out of the recess so that the keying formations are disengaged, allowing relative rotation of the head and body parts without restriction by either the keying formations or the locking formations, and (iii) the said relative rotation of the head and body parts after the keying formations have become disengaged allows the locking formations to be aligned and to engage one another so that the head and body parts can be rotated to become sealingly connected to one another, the angle through which the said free relative rotation prior to engagement of the locking formations is possible being greater than the angle through which relative rotation is possible when the keying formations are engaged with one another.

2. A filter assembly as claimed in claim 1, in which the head and body part keying formations are in the form of at least one recess which is provided in a rib on one of the head part and the filter element, and at least one projection which is provided on the other of the head part and the filter element, so that the projection can be received in the recess in the rib when the head part and the body part, with the filter element within it, are offered to one another to assemble the housing.

3. A filter assembly as claimed in claim 1, in which the at least one projection is provided by the internal walls of the head part.

4. A filter assembly as claimed in claim 1, in which there are provided at least two recesses and at least two projections.

5. A filter assembly as claimed in claim 1, further comprising a head stop member and a body stop member positioned to engage each other so as to prevent separative relative rotation of the head and body, when the keying formations are aligned.

6. A filter assembly as claimed in claim 5, in which one of the head and the body stop members is the at least one projection.

7. A filter assembly as claimed in claim 1, which includes an insert which can be positioned within the head part of the housing, and in which the head part keying formations are provided on the insert.

8. A filter assembly for removing material entrained in a fluid stream, comprising:
a filter element for removing material entrained in the fluid stream; a housing having a head part and a body part in which the filter element can be removably received and inlet and outlet ports for the fluid that is to be filtered the head art and the body part in which the filter element can be received each having locking formations which enable the head and body parts to be connected to one another and separated by relative rotation about an axis which is coaxial with a head axis and a body axis;

keying formations associated with each of the head and body parts, in the form of at least one recess and at least one projection, in which the body part keying formations are provided on the filter element when it is positioned in the body part arranged so that, (i) when the head part and the body part with the filter element positioned in the body part, are initially offered to one another to assemble the housing, the keying formations on the head part and the filter element engage one another with the projection located within the recess, thereby restricting relative rotation between the head part and the body part, (ii) continued movement of the head part and the body part towards assembly of the housing causes the projection to be moved out of the recess so that the keying formations are disengaged, allowing relative rotation of the head and body parts without restriction by either the keying formations or the locking formations, and (iii) the said relative rotation of the head and body parts after the keying formations have become disengaged allows the locking formations to be aligned and to engage one another so that the head and body parts can be rotated to become sealingly connected to one another, in which:

at least one of the inlet and outlet ports is provided by the head part, the head part having a chamber port in fluid communication with the at least one port in the head part;

the filter element has a filter port for the fluid;

a fluid tight connection can be provided between the filter port and the chamber port by sliding one of them into the other; and the body part keying formations are provided on the filter port.

9. A filter assembly as claimed in claim 8, in which the body part keying formations is provided by a recess in the inner side wall of the filter port.

10. A filter assembly as claimed in claim 9, in which a flange is provided extending around the inner side wall of the filter port, and in which the at least one recess is provided in the flange.

* * * * *